United States Patent
Ramachandrappa et al.

(10) Patent No.: US 10,963,501 B1
(45) Date of Patent: Mar. 30, 2021

(54) SYSTEMS AND METHODS FOR GENERATING A TOPIC TREE FOR DIGITAL INFORMATION

(71) Applicant: Veritas Technologies LLC, Mountain View, CA (US)

(72) Inventors: Naveen Ramachandrappa, San Jose, CA (US); Ramya Mula, San Jose, CA (US); Ashwin Kayyoor, Sunnyvale, CA (US); Bashyam Tca, Saratoga, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 167 days.

(21) Appl. No.: 15/582,625

(22) Filed: Apr. 29, 2017

(51) Int. Cl.
  *G06F 16/00* (2019.01)
  *G06F 16/33* (2019.01)
  *G06F 7/08* (2006.01)
  *G06F 16/31* (2019.01)

(52) U.S. Cl.
  CPC .......... *G06F 16/3347* (2019.01); *G06F 7/08* (2013.01); *G06F 16/322* (2019.01)

(58) Field of Classification Search
  CPC ............... G06F 17/30031; G06F 17/3069
  USPC ................................. 707/728, 739
  See application file for complete search history.

(56) References Cited

U.S. PATENT DOCUMENTS

| | | | |
|---|---|---|---|
| 5,721,902 A * | 2/1998 | Schultz | G06F 16/3338 |
| 5,963,940 A * | 10/1999 | Liddy | G06F 16/3329 |
| 6,675,159 B1 * | 1/2004 | Lin | G06F 40/253 |
| 6,766,316 B2 * | 7/2004 | Caudill | G06F 16/353 |
| 7,496,561 B2 * | 2/2009 | Caudill | G06F 17/3069 |
| 7,685,118 B2 * | 3/2010 | Zhang | G06F 17/30734 706/45 |
| 8,126,826 B2 * | 2/2012 | Pollara | G06N 20/00 706/14 |
| 8,140,559 B2 * | 3/2012 | Bobick | G06N 5/022 707/761 |
| 8,356,044 B2 * | 1/2013 | Stefik | G06Q 10/10 707/758 |
| 9,619,467 B2 * | 4/2017 | Pradhan | G06F 16/93 |
| 10,126,715 B2 * | 11/2018 | Tsuda | G06F 11/3024 |
| 10,339,440 B2 * | 7/2019 | Trask | G06N 3/08 |
| 10,489,500 B2 * | 11/2019 | Herr | G06F 40/166 |
| 10,528,866 B1 * | 1/2020 | Dai | G06N 3/08 |
| 2004/0133560 A1 * | 7/2004 | Simske | G06F 16/355 |
| 2006/0047632 A1 * | 3/2006 | Zhang | G06F 17/30734 |
| 2007/0106499 A1 * | 5/2007 | Dahlgren | G06F 16/243 704/10 |

(Continued)

OTHER PUBLICATIONS

Theme-Weighted Ranking of Keywords from Text Documents Using Phrase Embeddings, Mahata et al., IEEE (Year: 2018).*

(Continued)

*Primary Examiner* — Jean M Corrielus
(74) *Attorney, Agent, or Firm* — FisherBroyles, LLP

(57) ABSTRACT

The disclosed computer-implemented method for generating a topic tree for digital information may include parsing the digital information and extracting a set of keywords. This method may also include comparing the set of keywords to an ontology and extracting hierarchies from the ontology that match the set of keywords. The extracted ontology entries may then be pruned and sorted. Various other methods, systems, and computer-readable media are also disclosed.

12 Claims, 5 Drawing Sheets

(56) References Cited

U.S. PATENT DOCUMENTS

| | | | |
|---|---|---|---|
| 2009/0012842 A1* | 1/2009 | Srinivasan | G06F 17/2785 705/12 |
| 2009/0083200 A1* | 3/2009 | Pollara | G06N 20/00 706/14 |
| 2010/0131563 A1* | 5/2010 | Yin | G06F 16/355 707/794 |
| 2010/0179933 A1* | 7/2010 | Bai | G06F 16/313 706/12 |
| 2010/0185659 A1* | 7/2010 | Bai | G06F 16/313 707/769 |
| 2010/0191773 A1* | 7/2010 | Stefik | G06Q 10/10 707/797 |
| 2011/0270604 A1* | 11/2011 | Qi | G06F 16/3344 704/9 |
| 2013/0013603 A1* | 1/2013 | Parker | G06F 16/353 707/737 |
| 2013/0191391 A1* | 7/2013 | Pradhan | G06F 16/353 707/737 |
| 2014/0222433 A1* | 8/2014 | Govrin | G06Q 40/02 704/260 |
| 2014/0297268 A1* | 10/2014 | Govrin | G06Q 40/02 704/9 |
| 2016/0247061 A1* | 8/2016 | Trask | G06N 3/04 |
| 2017/0039176 A1* | 2/2017 | Broderick | G06F 40/197 |
| 2017/0235813 A1* | 8/2017 | Munro | G06F 17/30011 707/739 |
| 2017/0237966 A1* | 8/2017 | Ketterer | G06T 7/00 348/43 |
| 2017/0300470 A1* | 10/2017 | Khamis | G06F 40/289 |
| 2017/0308613 A1* | 10/2017 | Zhu | G06F 16/9535 |
| 2017/0337693 A1* | 11/2017 | Baruch | G06T 7/168 |
| 2017/0372165 A1* | 12/2017 | Jouhikainen | G06K 9/4609 |
| 2018/0121549 A1* | 5/2018 | Ramesh | G06F 16/9535 |
| 2018/0357531 A1* | 12/2018 | Giridhari | G06K 9/6267 |

OTHER PUBLICATIONS

Measuring similarity of academic articles with semantic profile and joint word embedding, Liu et al., IEEE (Year: 2017).*

An efficient technique for finding semantic similarity and their frequency between words, Yadav et al., IEEE (Year: 2013).*

From Frequency to Meaning: Vector Space Models of Semantics, Journal of Artificial Intelligence Research 37, pp. 141-188, Turney et al., (Year: 2010).*

Overview of the IBM Watson Natural Language Understanding service; https://www.ibm.com/watson/developercloud/doc/natural-language-understanding/index.html.

Support vector machine; https://en.wikipedia.org/wiki/Support_vector_machine.

Will Gries, "File Classification Infrastructure (FCI)", https://blogs.technet.microsoft.com/filecab/tag/file-classification-infrastructure-fci/.

Alex Casalboni, "Google Prediction API: a Machine Learning black box for developers"; http://cloudacademy.com/blog/google-prediction-api/.

Machine Learning API, http://www.datumbox.com/machine-learning-api/.

KnowledgeSEEKERTM Powerful Data Visualization, Segmentation and Strategy Development Software—with Best-in-Class Decision Trees!;http://www.angoss.com/predictive-analytics-software/software/knowledgeseeker/.

* cited by examiner

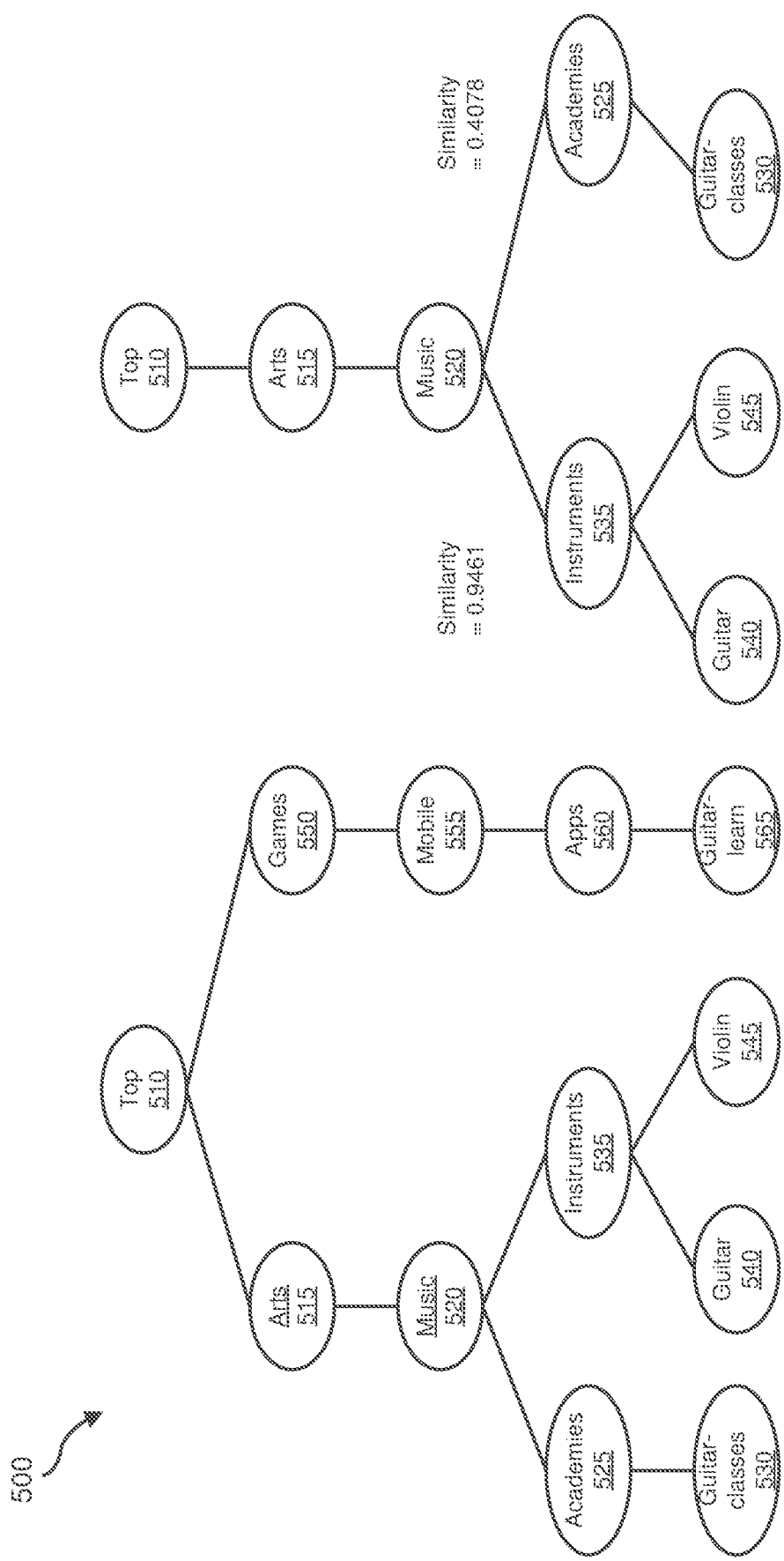

SYSTEMS AND METHODS FOR GENERATING A TOPIC TREE FOR DIGITAL INFORMATION

BACKGROUND

Machines having the ability to classify digital information (documents, blogs, emails, etc.) into a concise set of topics and subtopics can be extremely useful for many types of analytics. However, despite the advantages of state-of-the-art techniques, they are extremely slow and often trade performance for accuracy.

In view of these deficiencies in traditional classification systems, the instant disclosure identifies and addresses a need for improved systems and methods for classifying digital information.

SUMMARY

As will be described in greater detail below, the instant disclosure describes various systems and methods for generating a topic tree for classifying digital information. In one example, the disclosed systems and methods may parse the digital information, locate at least one sentence within the digital information, determine all nouns in the at least one sentence and remove any noun that is a proper noun such as a person's name, a location's name or an organization's name. The systems and methods may then extract a set of keywords by combining the remaining nouns with at least one similar word that is generated by the system or method. The system and method may compare the keywords to an ontology and extract at least one hierarchy from the ontology that matches a threshold number of the keywords. The at least one hierarchy may then be sorted by relevance.

In one or more examples, a system for generating a topic tree for digital information may include several modules stored in memory, including (1) a parsing module that parses the digital information and extracts a set of keywords, (2) a comparing module that compares the set of keywords to an ontology, (3) an extraction module that extracts at least one entry from the ontology that matches the set of keywords, and (4) a sorting module that sorts the at least one extracted ontology entry.

In one or more embodiments, a method for generating a topic tree for digital information may include (1) parsing the digital information and extracting a set of keywords, (2) comparing the set of keywords to an ontology, (3) extracting at least one entry from the ontology that matches the set of keywords, and (4) sorting the at least one ontology entry.

In some examples, the method for generating a topic tree for digital information may further include mapping the digital information to weighted vectors, such that the sorting of the extracted entries is based on the weighted vectors.

In one or more examples of the method for generating a topic tree for digital information the weighted vectors may be used by the computing device to generate a set of similar words, and the similarity may be determined by a cosine similarity between the weighted vectors.

In one or more embodiments of the method for generating a topic tree for digital information converting the digital information may include applying deep-learning techniques to the digital information.

In some examples of the method for generating a topic tree for digital information extracting the set of keywords may include locating sentences within the digital information, applying part-of-speech tagging to the sentences, and extracting at least one noun from each sentence. The at least one noun may be ignored after determining that it is a proper noun referring to a person or location.

In one or more examples a method for generating a topic tree for digital information may further include generating at least one additional word that is similar to the at least one noun.

In some examples of the method for generating a topic tree for digital information extracting the at least one entry from the ontology may include (1) comparing the keywords to hierarchies in the ontology, (2) selecting all hierarchies that include at least one keyword, and (3) removing all hierarchies from the selected hierarchies that do not include a threshold level of keywords.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) parse a digital document, (2) extract a set of keywords from the digital document, (3) compare the set of keywords to an ontology, (4) extract at least one hierarchy from the ontology that matches at least one of the keywords, and (5) sort the at least one extracted hierarchy.

Features from any of the above-mentioned embodiments and/or examples may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 5A is a block diagram of an example of merged hierarchies extracted from an ontology when generating a topic tree for digital information.

FIG. 5B is a block diagram of an example of sorted merged hierarchies when generating a topic tree for digital information.

Figure 1:
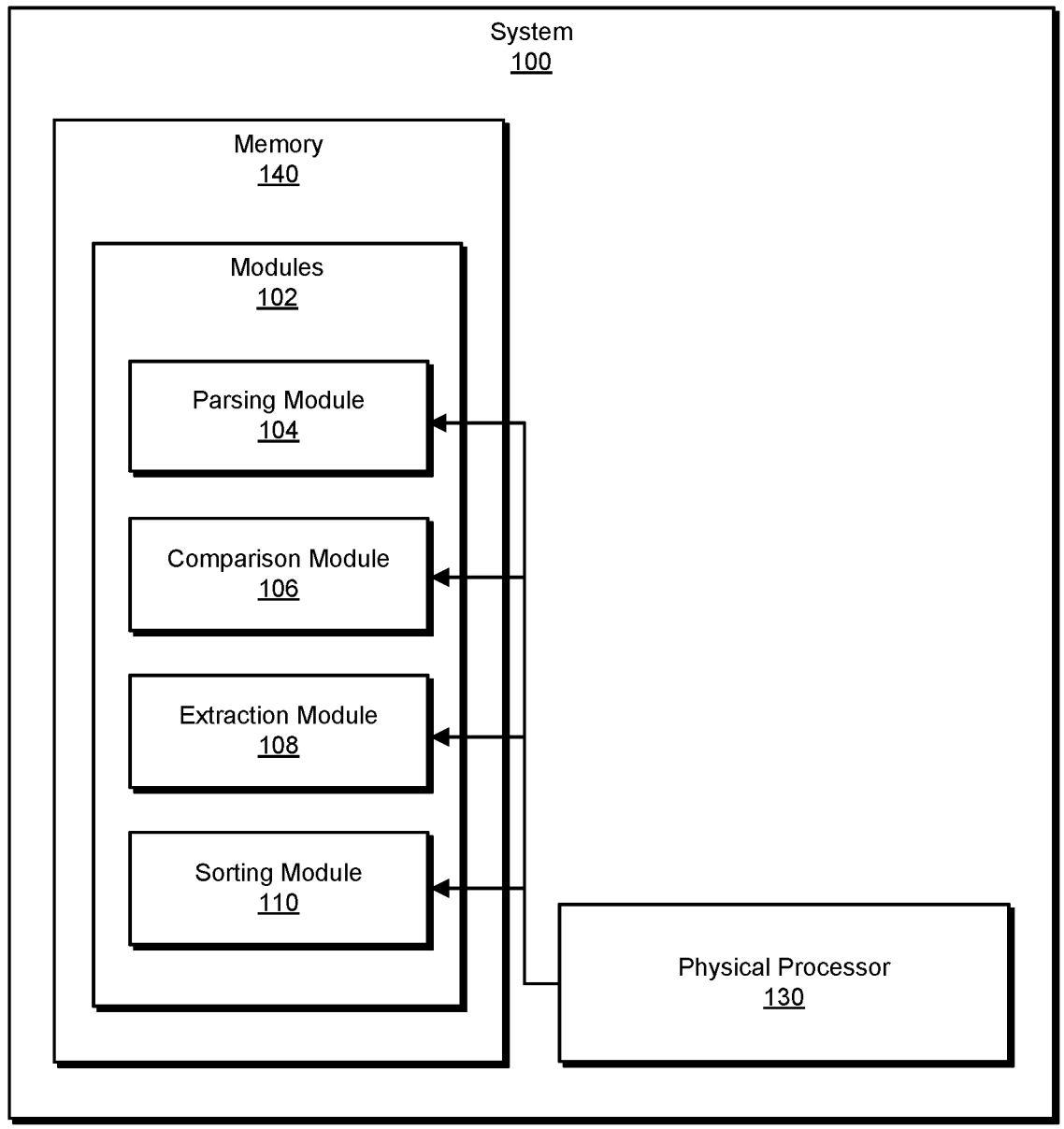
FIG. 1 is a block diagram of an example system for generating a topic tree for digital information.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for generating a topic tree for classifying digital information. As will be explained in greater detail below, by effectively and efficiently classifying digital information into a hierarchy of topics and subtopics, the various systems and methods described herein may enable and/or improve real-time analytics by improving the performance and accuracy of document classification systems. Moreover, one or more aspects of the systems and methods described herein may improve the creation of ontologies.

Figure 2:
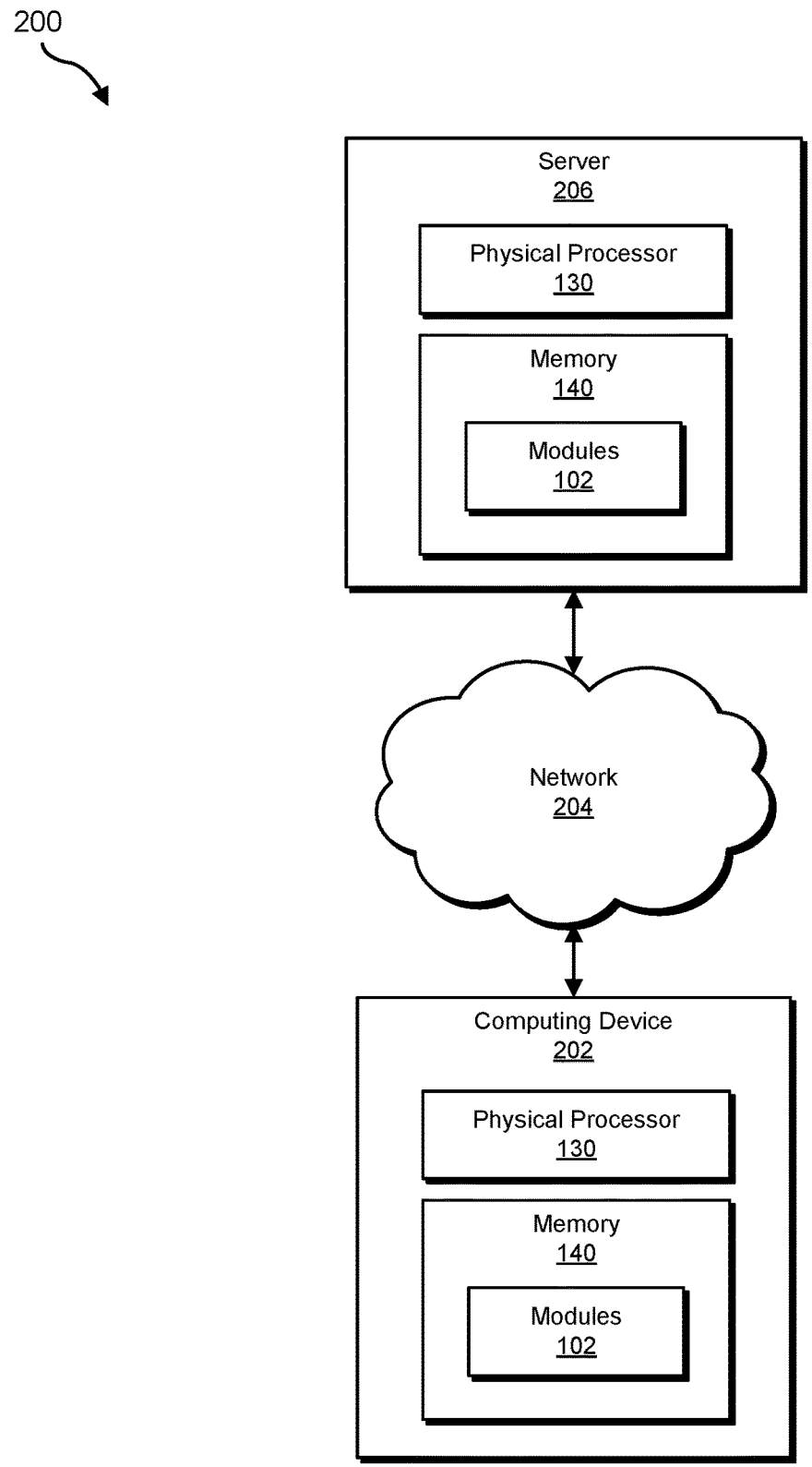
FIG. 2 is a block diagram of an additional example system for generating a topic tree for digital information.

The following will provide, with reference to FIGS. 1 and 2, detailed descriptions of example systems for generating a topic tree for digital information. Detailed descriptions of corresponding computer-implemented methods will also be provided in connection with FIGS. 3, 4 and 5.

FIG. 1 is a block diagram of an example system 100 for generating a topic tree for digital information. As illustrated in this figure, example system 100 may include one or more modules 102 for performing one or more tasks. As also illustrated in this figure, example system 100 may include a physical processor 130 that executes these modules. As will be explained in greater detail below, modules 102 may include a parsing module 104 that may parse digital information and extract a set of keywords from the digital information, a comparison module 106 that may compare the set of keywords to an ontology, an extraction module 108 that may extract hierarchies from the ontology that match the set of keywords, and a sorting module 110 that may sort the extracted hierarchies. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate generating a topic tree for digital information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

Computing device 202 generally represents any type or form of computing device capable of reading computer-executable instructions. Examples of computing device 202 include, network servers hosting blogs, Wikis and/or other informational websites, email servers, document servers, etc. that store digital information. While only a single computing device 202 is illustrated, the technology is not so limited. Those skilled in the art will recognize that multiple computing devices may be employed. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that can access documents and other digital information stored on server 206 or stored on computing device 202 and analyzing the same. Additional examples of server 206 include, without limitation, storage servers, database servers, email servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The term "disk," as used herein, generally refers to any medium used to store data. In one or more embodiments, a disk may include a physical disk. Examples of disks include, without limitation, optical disks, magnetic disks, analog disks, and/or any other suitable storage media. In one or more examples, the term disk may be used interchangeably with the term storage device which refers to an independent device which has storage, and hardware and/or software for communicating with the server and capable of interpreting and/or executing computer-readable instructions.

The term "digital information" or "document," as used herein, generally refers to digital text found in files, blogs, wikis, emails, etc. and may be used interchangeably herein.

The term "similar," as used herein, generally refers to words that have been mapped to vectors such that the cosine similarity between the vectors reveals correlated words.

The term "compare a set of keywords to an ontology," as used herein, generally refers to comparing at least one word from a set of keywords to at least one hierarchy of terms which forms the ontology.

The term "set," as used herein, generally refers to a group of one or more, although in an extreme case a set can be a null set.

Figure 3:
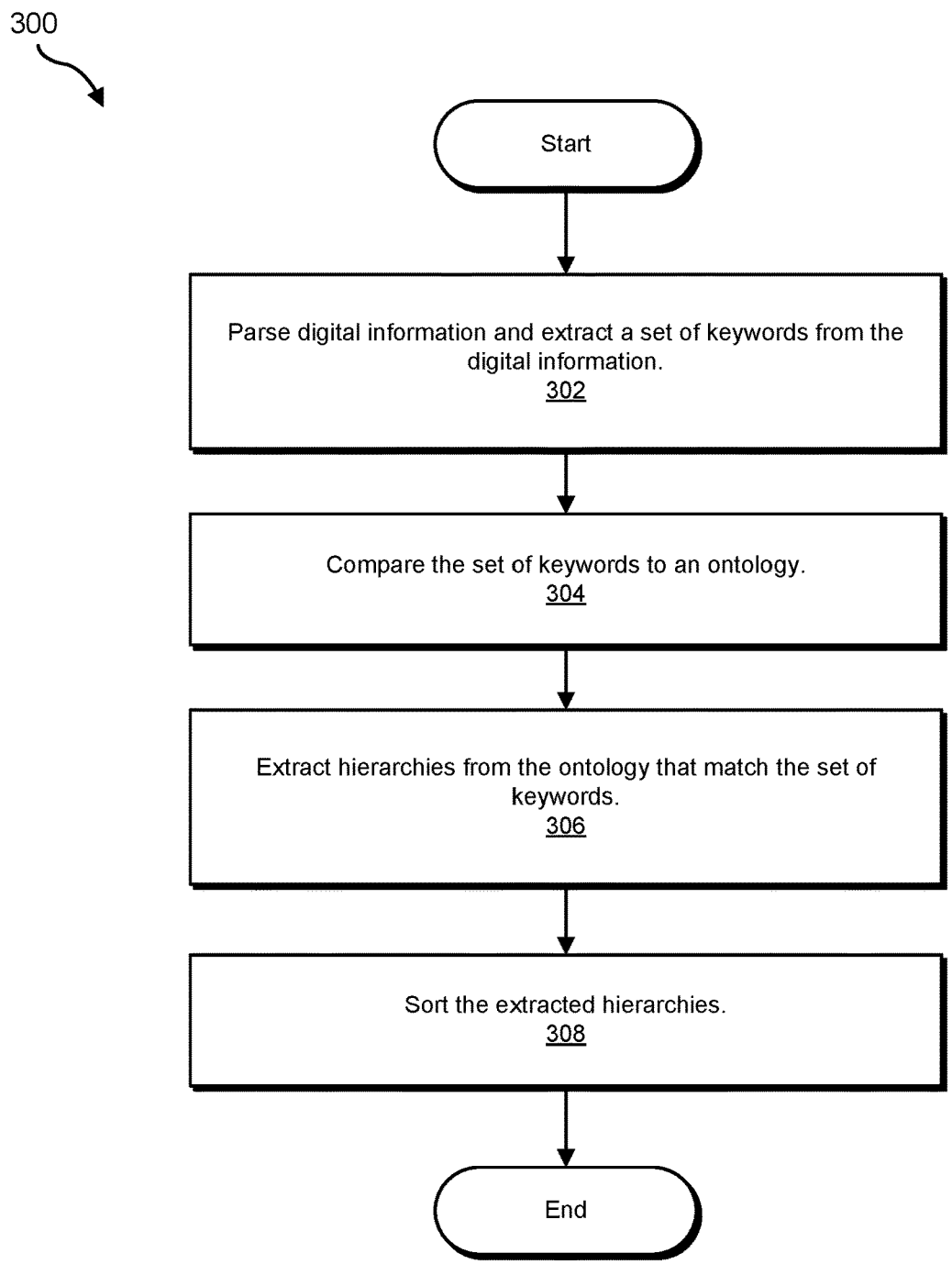
FIG. 3 is a flow diagram of an example method for generating a topic tree for digital information.
Figure 4:
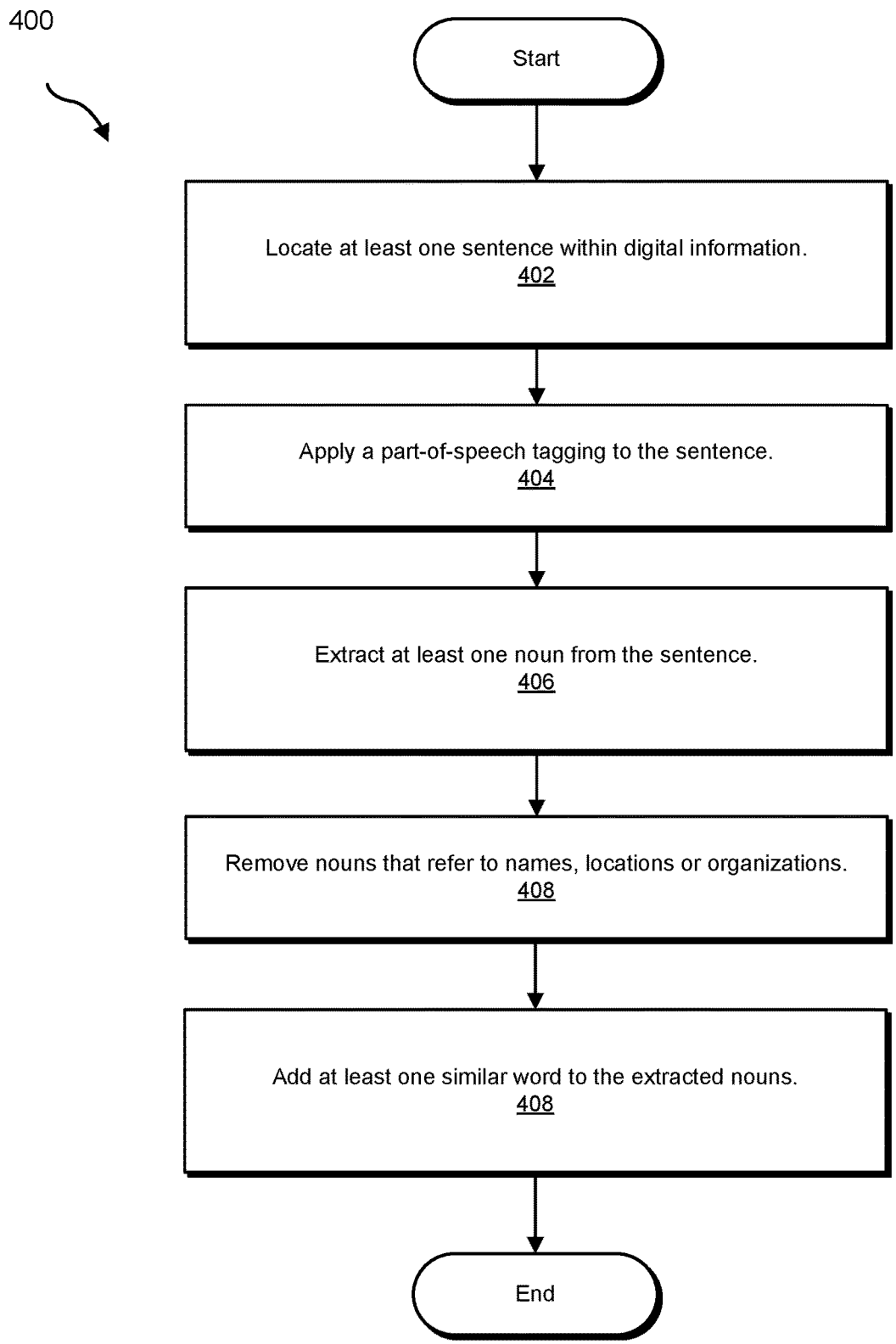
FIG. 4 is a flow diagram of an example method for extracting a set of keywords when generating a topic tree for digital information.

FIGS. 3 and 4 are flow diagrams of an example computer-implemented method 300 for generating a topic tree for digital information. The steps shown in FIGS. 3 and 4 may be performed by any suitable computer-executable code and/or computing system, including system 100 in FIG. 1, system 200 in FIG. 2, and/or variations or combinations of one or more of the same. In one or more examples, each of the steps shown in FIG. 3 may represent an algorithm whose structure includes and/or is represented by multiple substeps, examples of which will be provided in greater detail below.

As illustrated in FIG. 3, one or more of the systems described herein may improve the effectiveness and accuracy of document classification. For example, as illustrated at step 302 parsing module 104 may, as part of server 206 in FIG. 2, parse digital information stored on server 206 and/or computing device 202 and extract a set of keywords from the digital information.

The systems described herein may perform step 302 in a variety of ways. In one example, parsing module 104 may locate all sentences within the digital information and, for each sentence, determine all of the nouns (Step 402-404 of FIG. 4). Parsing module 104 may then select all of the nouns other than proper nouns such as persons, locations, and organizations (Step 406-407 of FIG. 4). Parsing module may then determine various words that are similar to the selected nouns (Step 408 of FIG. 4) and the combination of selected nouns and similar words may be the set of keywords.

At step 304, comparison module 106 may compare the set of keywords to an ontology. The term "ontology," as used herein, may refer to machine-interpretable definitions of basic concepts and relations among them. In some examples, these may be in the form of hierarchies having different levels of scope (see, e.g., FIGS. 5A and 5B).

The systems described herein may perform step 304 in a variety of ways. In one example, comparison module 106 may compare one or more words from the set of keywords to the various hierarchies and, so long as the word matches at least one level of the hierarchy, that hierarchy may be said to match the keyword.

At step 306 of FIG. 3, extraction module 108 may extract hierarchies from the ontology that match the set of keywords. The systems described herein may perform step 306 in a variety of ways. In one example, extraction module 108 may include all matches or it may include only those matches that meet or exceed a threshold level. For example, a hierarchy may be considered a match if at least one keyword from the set of keywords matches at least one level of the hierarchy, a hierarchy may only be considered a match if all keywords from the set of keywords are found in the hierarchy, or a hierarchy may be considered a match if the number of keywords found in the hierarchy meets or exceeds a threshold number of keywords.

At step 308, sorting module 110 may merge all of the hierarchies and sort the extracted hierarchies by their relevance. The systems described herein may perform step 308 in a variety of ways. In some examples, sorting module 110 may arrange the levels of the hierarchies in a particular order (e.g., left to right) in descending order of relevance. This order or arrangement may be left to right, right to left, or any other order which enables the higher relevance terms to be differentiated from the lower relevance terms.

As explained above in connection with FIGS. 1-5, the present disclosure is generally directed to systems and methods for generating a topic tree for digital information. Given a corpus and ontology as input, the below steps may be employed to generate a concise topic tree for a set of documents: (1) apply deep-learning techniques to train the system and generate word embeddings on the corpus, (2) define smart data features and extract them for the set of documents, (3) using extracted data features, retrieve relevant topic hierarchies from the ontology, (4) merge all of the relevant topic hierarchies and smartly prune them to get a concise topic tree, and (5) sort the nodes in each level of the topic tree based on relevance scores from word embeddings. Each of these steps will now be discussed, in turn.

Generate word embeddings: The term "word embedding," as used herein, generally refers to a mapping of words to vectors of real numbers in reduced dimension. These embeddings may encode information about a correlation with other words. Once word embeddings are generated, the cosine similarity between the vectors may be employed to find highly correlated words. In some examples, deep-learning techniques may be employed to generate word embeddings. For example, two deep-learning models, such as a continuous bag of words (CBOW) model and/or a Skip-Gram model with negative sampling, may be employed. Since deep learning is based on neural networks (NN), there may be input neurons, output neurons, and hidden neurons. In some examples, the number of input neurons may be equal to the number of output neurons, and the number of neurons in the hidden layer (Nh) may be much smaller (lower dimension). For example, given a target word 't' in the input layer, and a set of tokens that co-appear with word 't' in the output layer, weights can be calculated on the hidden layer neuron. In addition, given N training samples, the hidden layer may be trained in a way that, for each target word, a vector (Vf) of length Nh is returned containing the weights of hidden-layer neurons. When a Skip-Gram model is used, a model file will be created, where each line belongs to a word and its corresponding vector. Similar to Skip-Gram, a CBOW model can also be used where context words are presented to the input layer and a target word is presented to the output layer to learn the weights of the hidden layer.

In some examples, the systems described herein may apply one or more similarly functions. For example, the function FindNSimilarWords(word, n) may be applied to the above-described word embeddings, where 'word' is an input and 'n' is the number of desired correlated tokens. Given a token 'word', the cosine similarity may be calculated between the vector representations of the tokens and 'n' correlated tokens may be returned in vector space. Additionally or alternatively, the function FindSimilarity(word1, word2) may be applied, where 'word1' and 'word2' are inputs of words from the digital information. This function may return cosine similarity between vectors of word1 and word2. In some examples, this function can also be extended to take a set of words; e.g., the function FindNSimilarity (W={w1, w2, . . . }, word1) may be applied, where 'W' and 'word1' are inputs and 'W' is the set of words. In this example, the function first calculates the average vector for all of the words in the set W and then returns cosine similarity between vectors avg(W) and word.

Define and extract smart data features. Given unstructured data, intelligent keyword extraction may be applied to extract 'm' keywords, say KI. Nouns and proper nouns (excluding persons and locations) within an artifact may be indicative of an overall topic of a given artifact. For example, in the sentence "John lives in California. He was suffering from arthritis.", the noun "arthritis" may be indicative of the overall topic (e.g., health) of the sentence.

In some examples, at least one sentence (and in some cases all sentences) from a given artifact may be retrieved, and for each retrieved sentence, part-of-speech (POS) tagging may be applied to the sentence. POS tagger may tag each keyword token within a sentence with an appropriate part-of-speech tag. For example, POS tagging may transform the above exemplary sentence to "John [NNP] lives [VBZ] in [IN] California [NNP]. He [PRP] was [VBD] suffering [VBG] from [IN] arthritis [NNP].". In this example, the tag 'PRP' indicates 'personal pronoun', 'VBD' indicates verb-past tense, 'VBZ' indicates verb-present tense, 'NNP' indicates proper singular noun, 'IN' indicates preposition, etc. From these, keywords with noun tags (e.g., NN, NNS, NNP, NNPS) may be extracted, which may result in the keyword set KNN. Continuing with the above example, KNN={John, California, arthritis}.

In some examples, named entity recognition (NER) tagging may also be applied to the sentences. NER tagging may recognize, for example, three types of entities within a given sentence (e.g., person, location, and organization names). After applying NER tagging, only person names and location names may be extracted, while organization names may be ignored, resulting in the keyword set KPL. In the above example, KPL={John, California} since these keywords represent person and location names. To get the intelligent keyword set, the keywords in KPL may be removed from KNN, which gives the result KI. In the above example, KI=KNN−KPL={John, California, Arthritis}−{John, California}={Arthritis}.

In some examples, the intelligent keyword set may be enriched by adding similar keywords. Similar keywords may be obtained by calling, for example, FindNSimilarWords(word, n), where 'word' is each keyword and 'n' is the number of similar keywords to be added. In the above example, the final set will be K=KI+{generated similar keywords for each keyword in KI}, where 'K' is the final data feature set that represents the digital information. In the above example, K={Arthritis, Disease, Pain, Muscle, Health, Fitness, Treatment, etc.}.

Retrieve hierarchies from an ontology: An ontology is usually a large set of hierarchal topic information (usually domain specific). For example, O={/top, /top/medical, /top/medical/disease, /top/resource, /top/resource/water, etc.}, where '/top' is the root element of the ontology. In some examples, relevant topic hierarchies may be located by searching the keywords (extracted data features) against the leaves of all of the topic hierarchies in the ontology, which may return topic hierarchies for each keyword. In the above example, the relevant topic hierarchies found would be H={/top/medical/disease, /top/medical/disease/arthritis, /top/medical/condition/pain, etc.}.

Merge hierarchies and prune: In some examples, the topic hierarchies of all of the keywords may be merged together and keyword frequencies calculated until a first level and paths with a frequency less than a threshold (e.g., 40% keywords) may be filtered. "Keyword frequency" may refer to the number of keywords denoted by that node. For example, if every keyword represents different higher-level topics, then by performing this step the topic tree may be smartly pruned. In the above example, the sentence recites "arthritis," which is a medical disease. Since "treatment" is one of the data artifacts, this may match with different hierarchies like {/top/medical/treatment} and {/top/resource/water/treatment}. As such, the hierarchy /top/resource/water/treatment may be pruned as the majority of the keywords would not fall under the second level topic (i.e., "resource").

Sort the topic tree based on relevance: In some examples, the nodes may be sorted in each level of the topic tree based on the score resulted by FindNSimilarity(W={w1, w2, . . . }, word1), where 'W' is the extracted data artifacts/keywords and 'word1' is the node name. Doing so may sort the relevant topics with descending relevance from left to right in each level of the topic tree. In the above example, if the nodes in a level are "diseases" and "medicines" and K={Arthritis, Disease, Pain, Muscle, Health, Fitness, Treatment, etc.}, then upon calling FindNSimilarity(K, "diseases") and FindNSimilarity(K, "medicines"), the resulting score would be FindNSimilarity(K, "diseases")>FindNSimilarity(K, "medicines"), which holds true in the above example which references arthritis (a disease) but not medicine.

FIGS. 5A and 5B illustrate merging and sorting with regard to the following exemplary sentence: "Famous music instruments played around the world are Guitar, Violin and Flute. N={Guitar, Violin, Flute, music, instruments, world, piano . . . }. Assuming the ontology is
/top/arts/music
/top/arts/music/instruments
/top/arts/music/instruments/guitar
/top/arts/music/instruments/violin
/top/arts/music/instruments/piano
/top/arts/music/instruments/flute
/top/arts/music/academies/guitar-classes
/top/games/mobile/apps/guitar-learn
/top/business/software /top/society/work/employment
/top/games/outdoor/soccer
the relevant Topic Hierarchies may include:
/top/arts/music/instruments
/top/arts/music/instruments/guitar
/top/arts/music/instruments/violin
/top/arts/music/academies/guitar-classes
/top/games/mobile/apps/guitar-learn FIGS. 5A and 5B also illustrate the merging of the topic hierarchies (FIG. 5A) and then sorting the merged hierarchies by relevance (FIG. 5B).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating a topic tree for digital information to classify said digital information into a hierarchy of topics and subtopics, the method comprising:
   parsing the digital information to locate at least one sentence;
   determining at least one noun in the digital information;
   generating at least one word that is similar to the at least one noun;

removing at least one proper noun from the digital information, wherein the proper noun includes at least one of: a person's name, a location's name, or an organization's name;

extracting a set of keywords from the digital information, wherein the set of keywords comprises the at least one noun and the at least one word that is similar to the at least one noun;

comparing the set of keywords to an ontology;

extracting at least one hierarchy from the ontology that matches the set of keywords by comparing the set of keywords to a plurality of hierarchies in the ontology, selecting all hierarchies that include at least one keyword from the set of keywords, and removing all hierarchies from the selected hierarchies that do not include a threshold number of keywords;

generating word embeddings that encode information about a correlation with other keywords using cosine similarity between vectors to find correlated keywords between the set of keywords;

merging all the hierarchies extracted from the ontology; and sorting the merged hierarchies extracted from the ontology based on relevance scores from the word embeddings for the topic tree for digital information.

2. The method according to claim 1, further comprising mapping the digital information to weighted vectors, wherein the sorting of the at least one extracted hierarchy is based on the weighted vectors.

3. The method according to claim 2, further comprising generating a set of similar words based on a cosine similarity between the weighted vectors.

4. The method according to claim 1, wherein extracting the set of keywords comprises:

locating a plurality of sentences within the digital information; and applying part-of-speech tagging to the located plurality of sentences.

5. A system for generating a topic tree for digital information to classify said digital information into a hierarchy of topics and subtopics, the system comprising:

a parsing module, stored in memory, that parses the digital information to locate at least one sentence, determines at least one noun in the digital information, generates at least one word that is similar to the at least one noun, removes at least one proper noun from the digital information, wherein the proper noun includes at least one of: a person's name, a location's name, or an organization's name, and extracts a set of keywords, wherein the set of keywords comprises the at least one noun and the at least one word that is similar to the at least one noun;

a comparison module, stored in memory, that compares the set of keywords to an ontology; an extraction module, stored in memory, that extracts a plurality of hierarchies from the ontology that match the set of keywords by comparing the set of keywords to a plurality of hierarchies in the ontology, selects all hierarchies that include at least one keyword that match from the set of keywords, removes all hierarchies from the selected hierarchies that do not include a threshold number of keywords, generates word embeddings that encode information about a correlation with other keywords using cosine similarity between vectors to find correlated keywords between the set of keywords, and merges all the hierarchies extracted from the ontology;

a sorting module, stored in memory, that sorts the merged hierarchies extracted from the ontology based on relevance scores from the word embeddings for the topic tree for digital information; and at least one processor that executes the parsing module, the comparison module, the extraction module, and the sorting module.

6. The system according to claim 5, further comprising a mapping module, stored in memory, that maps the digital information to weighted vectors, wherein the sorting module sorts the extracted hierarchies based on the weighted vectors.

7. The system according to claim 6, wherein the mapping module generates a set of similar words based on a cosine similarity between the weighted vectors.

8. The system according to claim 5, wherein the parsing module extracting the set of keywords:

locates a plurality of sentences within the digital information; and applies part-of-speech tagging to the located plurality of sentences.

9. A non-transitory computer-readable medium comprising one or more computer-executable instructions that, when executed by at least one processor of a computing device generate a topic tree for digital information to classify said digital information into a hierarchy of topics and subtopics by causing the computing device to:

parse a digital document to locate at least one sentence;

determine at least one noun in the digital document;

generate at least one word that is similar to the at least one noun;

remove at least one proper noun from the digital document, wherein the proper noun includes at least one of: a person's name, a location's name, or an organization's name;

extract a set of keywords from the digital document, wherein the set of keywords comprises the at least one noun and the at least one word that is similar to the at least one noun;

compare the set of keywords to an ontology;

extract at least one hierarchy from the ontology that matches at least one keyword of the set of keywords by comparing the set of keywords to a plurality of hierarchies in the ontology, selecting all hierarchies that include at least one keyword from the set of keywords, and removing all hierarchies from the selected hierarchies that do not include a threshold number of keywords;

generate word embeddings that encode information about a correlation with other keywords using cosine similarity between vectors to find correlated keywords between the set of keywords;

merge all the hierarchies extracted from the ontology; and sort the merged hierarchies from the ontology based on relevance scores from the word embeddings for the topic tree for digital information.

10. The non-transitory computer-readable medium according to claim 9, wherein:

the one or more computer-executable instructions cause the computing device to map the digital information to weighted vectors; and the sorting of the at least one extracted hierarchy is based on the weighted vectors.

11. The non-transitory computer-readable medium according to claim 10, wherein the one or more computer-executable instructions cause the computing device to generate a set of words that are similar to the keywords based on a cosine similarity between the weighted vectors.

12. The non-transitory computer-readable medium according to claim 9, wherein extracting the set of keywords comprises:
  locating a plurality of sentences within the digital information; and
  applying a part-of-speech tagging to the located plurality of sentences.

* * * * *